United States Patent
Buchs et al.

(10) Patent No.: US 8,321,359 B2
(45) Date of Patent: Nov. 27, 2012

(54) METHOD AND APPARATUS FOR REAL-TIME WEBSITE OPTIMIZATION

(75) Inventors: Francois Buchs, Pompano Beach, FL (US); Zijad F. Aganovic, Delray Beach, FL (US)

(73) Assignee: Hiconversion, Inc., Boca Raton, FL (US)

( * ) Notice: Subject to any disclaimer, the term of this patent is extended or adjusted under 35 U.S.C. 154(b) by 775 days.

(21) Appl. No.: 11/880,823

(22) Filed: Jul. 24, 2007

(65) Prior Publication Data

US 2009/0030859 A1 Jan. 29, 2009

(51) Int. Cl.
*G06E 1/00* (2006.01)
*G06E 3/00* (2006.01)
*G06F 15/18* (2006.01)
*G06G 7/00* (2006.01)

(52) U.S. Cl. .......................................... 706/19
(58) Field of Classification Search .................... 709/19; 706/19
See application file for complete search history.

(56) References Cited

U.S. PATENT DOCUMENTS

| | | | | |
|---|---|---|---|---|
| 6,701,441 | B1 * | 3/2004 | Balasubramaniam et al. | . 726/25 |
| 2002/0138525 | A1 * | 9/2002 | Karadimitriou et al. | ...... 707/530 |
| 2006/0074910 | A1 * | 4/2006 | Yun et al. | ............................. 707/7 |
| 2007/0124208 | A1 * | 5/2007 | Schachter et al. | ............... 705/14 |
| 2007/0168465 | A1 * | 7/2007 | Toppenberg et al. | .......... 709/218 |

OTHER PUBLICATIONS

Marek Obitko, Genetic Algorithms [online], Jun. 4, 2003 [retrieved on Jun. 11, 2010]. Retrieved from the Internet:<http://labe.felk.cvut.cz/~obitko/ga/>.*

'Adaptive web sites: an Al challenge': Perkowitz, 1997, IJCAI, pp. 16-23.*

* cited by examiner

*Primary Examiner* — Kakali Chaki
*Assistant Examiner* — Peter Coughlan
(74) *Attorney, Agent, or Firm* — Gregory P. Gadson

(57) ABSTRACT

A novel method of automated, real-time website optimization at least includes: a) receiving website optimization data including an optimization goal, and website source code; b) receiving website optimization criteria indicative of the completion of a website optimization experiment; c) executing an optimization algorithm used to select an optimized website version; d) comparing the output of the optimization algorithm with the website optimization goal to determine whether the website version under consideration is optimized; e) providing feedback from the output of the executed optimization algorithm to an input of the optimization algorithm; f) based upon the feedback, determining the next iterative step of the optimization algorithm; g) performing new iterative steps of the optimization algorithm; h) converging to an optimized website state; and i) modifying the website source code to implement the optimum version of the website.

20 Claims, 6 Drawing Sheets

METHOD AND APPARATUS FOR REAL-TIME WEBSITE OPTIMIZATION

BACKGROUND OF THE INVENTION

1. Field of the Invention

The present invention relates to schemes for automatically and intelligently searching for the best versions of websites by optimizing user defined criteria.

2. Background

The online advertisement industry is experiencing a dramatic growth fueled by its low cost and interactivity. While a great deal of time and money has been dedicated to increasing website traffic, heretofore, little attention has been paid to increasing website conversion rates (i.e., the rates at which website visitors engage in desired business activity while visiting the website).

Optimizing a website to increase conversion rates is a very complex undertaking. One problem is that visitor demographics and preferences are not known. Another problem is that each page of a website consists of a large number of variable factors, such as page content, visuals, call-for-action links (callouts), fonts, and page layouts. Combinations of these factors create millions of possible variations on the look and feel of a particular web page. Yet, empirical evidence shows that a minute change in the website look and feel, such as the color of a "submit" button, for example, can dramatically change the conversion rate of the web page.

An additional challenge to website optimization is the real-time nature of the online marketing. Often, a major marketing promotion can be finished in matter of minutes or hours, leaving no time for any manual experimentation or analysis. And finally, making any changes to a website is a very labor intensive process.

Companies are attempting to increase website conversion through variety of approaches. Some approaches rely entirely on the experience of consultants and designers who apply their rich empirical knowledge to produce a website expected to have a high conversion rate. Such an approach, however, is a subjective one. What is successful for one company may not be effective for another. Further, even if a new version is more successful than a previous version, it is not clear as to whether the website has reached the maximum conversion rate.

Others apply scientific methods of measuring website conversion, and run experiments for the purpose of finding a version of the website that has the highest conversion rate. The simplest method is the so called "A/B" testing method. In essence, this is a brute force method where two (or some small number) of the most likely versions of the website are tested to find the better one. Normally, the A/B experiments are perpetually performed in a never-ending search for a better solution. These experiments are labor intensive, and their search methodology is quite inefficient. If one is testing a few out of millions of possible variations of the single page, it is easily understandable that the probability of finding the best solution is quite low.

A much better method is the multivariable (or multivariate) testing method offered by companies such as Google, Memetrics, Optimost LLC, SiteSpect, Offermatica, and others. This Letters Patent hereby classifies those methodologies as an open loop approach, or a batch processing website optimization method. The open loop methodology relies on the following key optimization steps: experiment design; experiment execution; and statistical analysis and modeling.

"Open-loop" is a well-known term of art from the field of automatic control systems. Consistent with the definition, an open-loop controller does not utilize feedback to determine if its output has achieved the desired goal of its input, or stated another way, an open-loop system does not observe the output of the processes that it is controlling.

In the experiment design a vendor may choose a full factorial approach (i.e. test all possible variations of a page or website pages) or fractional factorial approach, where only a subset of possible page variations is tested. Vendors might use different approaches in designing the optimization experiments, but the common outcome is a creation of a list of the web page (web site) versions (i.e., different page impressions), that will be tested. In the next step, all page impressions from the said list are tested, and measurement data is collected. During the statistical analysis and modeling phase, the experimental data is processed to predict the best variation of the page (or website). Different statistical methods may be used in the statistical analysis step, such as, for example, the Taguchi method, Bayesian Markov Chain Monte Carlo estimation procedures, or a Genetic Algorithm.

This open-loop approach suffers from a number of disadvantages. Since statistical characteristics of the variable elements included in the experiment are not known beforehand, the experiment designers are forced to create the experiments containing a large number of the page impressions that are participating in the experiment. As a result, the experimentation is time consuming, and more expensive than is desirable. The methodology involves static optimization (e.g., test once, and use the best solution), while the online marketplace is very dynamic, with rapidly changing user preferences and requirements. Such an approach will not be able to detect or respond to the aforementioned changes. Finally, the approach is hardwired for a specific statistical methodology, and such a "one size fits all" approach might not work well for different types of customers.

Several prior art Letters Patents related to website optimization are discussed below. U.S. Pat. No. 6,934,748 to Louviere, et al. discloses an automated open loop (i.e., no feedback) system for experimentation that includes an experiment engine which can define an experiment relating to various treatments for a set of content elements. U.S. Patent Application Number 20040123247 by Wachen discloses a method and apparatus for altering electronic content that includes a template for assigning variables and values to a section of the content, a generator that creates the permutations of the content, a transmitter that provides the content to a requestor and an evaluator and optimizer that aids in selecting the most optimal permutation of the content. U.S. Patent Application Number 20060271671 by Hansen, discloses a method and system for optimizing web visitor conversion using a reverse proxy server to introduce page variations on existing website content without the need to modify the existing target server.

U.S. Patent Application Number 20030014304 by Calvert, et al. discloses a method of evaluating Internet advertisement effectiveness that involves collecting Internet activity information associated with a multitude of "cookies." U.S. Pat. No. 5,968,125 to Garrick, et al. discloses a process for determining the effectiveness of a web page to a visitor by creating alternative and test web pages, sending requests to the test web page, and monitoring the use of the web page and the rate that the web page objective was met and replacing pages with the page most visited. U.S. Patent Application Number 20020042738 by Srinivasan, et al. discloses a method and system for measuring the effectiveness of the layout or appearance of a website advertisement to a visitor, wherein different visitors are shown different formats of the same page, response to the page is monitored, and statistics are analyzed regarding the responses.

U.S. Patent Application Number 20030018501 by Shan discloses a method and system for processing test data relevant to specific behavior of visitors of a website. U.S. Pat. No. 6,662,215 to Moskowitz, et al. discloses a system and method for determining appropriate website content for consumers comprising a server arrangement, including a "real time content optimization" server, a user computer, and a network, wherein upon request a web page is generated for the user having static and dynamic elements which are tested for user reaction and response.

SUMMARY OF THE INVENTION

The invention comprises a method and apparatus that will enable a fully automated, self-learning (adaptive) website optimization solution based on a closed-loop approach. The new approach is not limited to a particular optimization methodology or a particular optimization algorithm. Instead, it is a framework that enables the use of the existing or new inventive optimization methods or algorithms in website optimization closed loop applications. The present-inventive method and apparatus include the ability to assign variable factors and measured goals, the ability to initialize the optimization process, and then to automatically generate changes in the website while measuring visitor responses until the process converges to the best solution. The automated website changes are driven by the optimization algorithm which enables convergence toward the best solution after testing only a limited number of possible web page (website) variations. The method can be applied to any type of website, programmed in any type of programming language, regardless of number of website tiers and components, type of operating system and web server.

To achieve high reliability and high performance the present-inventive method and apparatus provides for highly parallel distributed computing with a unique way of queuing optimization steps to maximize the use of computing assets, as well to ensure that the end user experience is not compromised.

The benefits achieved by this approach are: 1) Increased website optimization speed, as the dynamic self-learning approach will require testing of a minimum subset of all possible variations of the web page (web site), ensuring the best possible solution with the minimum number of testing iterations; 2) The ability to adapt to dynamical website changes, as self-learning algorithms will learn about changes in behavior of website visitors and adopt its results accordingly; and 3) Support for multiple optimization methods and algorithms, as no single algorithm or a method can effectively solve every type of the optimization problem or every type of customer demographics.

In view of the aforementioned problems and deficiencies of the prior art, the present invention provides method of automated, real-time website optimization that at least includes: a) receiving website optimization data including an optimization goal, and website source code; b) receiving website optimization criteria indicative of the completion of a website optimization experiment; c) executing an optimization algorithm used to select an optimized website version; d) comparing the output of the optimization algorithm with the website optimization goal to determine whether the website version under consideration is optimized; e) providing feedback from the output of the executed optimization algorithm to an input of the optimization algorithm; f) based upon the feedback, determining the next iterative step of the optimization algorithm; g) performing new iterative steps of the optimization algorithm; h) converging to an optimized website state; and i) modifying the website source code to implement the optimum version of the website.

The present invention also provides an optimization system for the automated, real-time optimization of a website at least including: a) an Internet device adapted to allow access to a website by an Internet user; b) a web server adapted to host the website; c) a website configuration management module adapted to automatically change the website content and appearance; d) a website performance measurement module adapted to automatically measure multiple performance variables; and e) an optimization engine adapted to execute one or more optimization algorithms. The optimization engine is further adapted to receive feedback from the output of the executed optimization algorithm to an input of the optimization algorithm, based upon the feedback, determine the next iterative step of the optimization algorithm, perform new iterative steps of the optimization algorithm, and converge the website to an optimized state.

Additional objectives and advantages of the invention will be further explained in the description that follows.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 1:
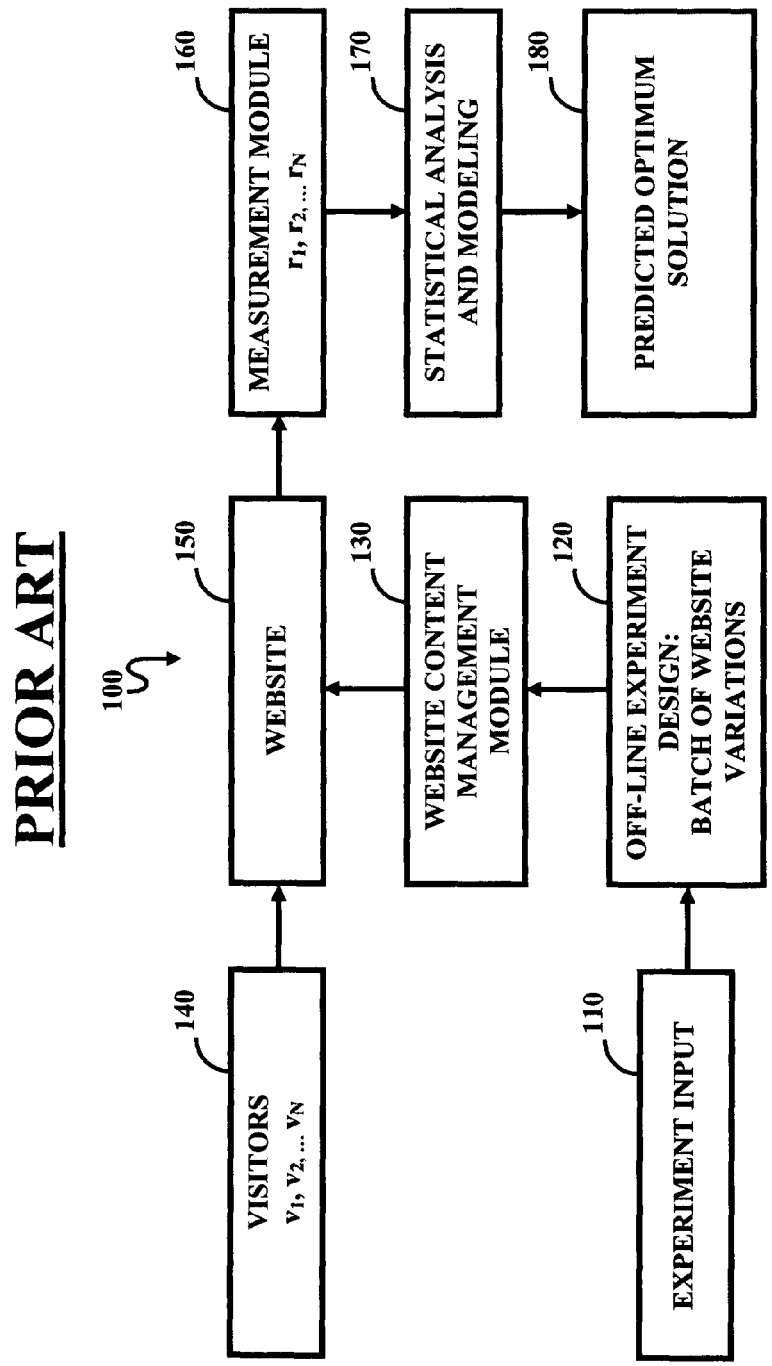
FIG. 1 is a schematic diagram of a prior art process for open loop website optimization.

FIG. 1 illustrates a prior art system 100 depicting the open loop nature of the existing website optimization methods. To begin an open loop web optimization process, an Experiment Input Module 110 defines variable elements and optimization goals for the optimization experiment. Once experiment input is complete, an experiment design module 120 generates a batch of website optimization experiments, i.e. variations of web page (or website if it is multi-page experiment). Next, the batch of the website optimization experiments is tested with real website visitors (symbolically represented by the element 140) via changing the version of the website 50 through a Website Content Management Module 130 that translates the experiment design data into different versions of website content.

Results of visitors' activity on the website 150 are measured and collected by a measurement module 160 in accordance with the user-defined optimization goals. A Batch of data is then statistically analyzed and modeled by a statistical analysis and modeling module 170 to predict the optimum solution 180. The optimum solution might be then further tested so the estimates can be proved or returned back to the statistical analysis model for further modeling and better prediction.

Figure 2:
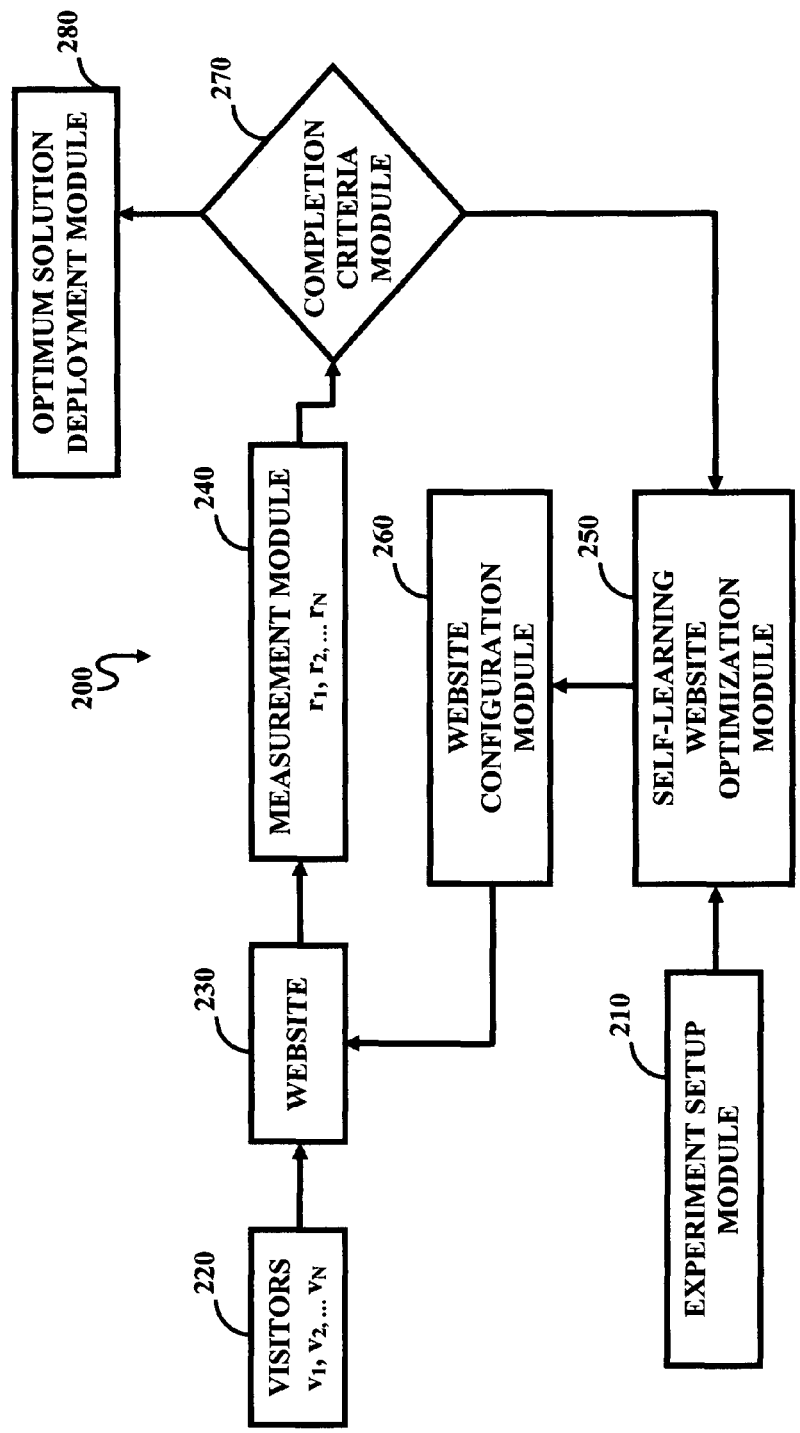
FIG. 2 is a schematic diagram of a process for closed loop website optimization according to the present invention.

The general process diagram for the present-inventive closed loop (i.e., self-learning and adaptive) optimization method 200 is illustrated in FIG. 2. The optimization process is initialized by an Experiment Setup Module 210. Once the experiment is set and ready for execution the process of experimentation is initialized by one or more initial web page (or website) configurations generated by a Self-learning Website Optimization Module 250, and then performed by a Website Configuration Module 260. Live visitors (symbolically represented by the number 220) who visit a Website 230 are tracked, and the result of their actions is measured by a Measurement Module 240. Via a Completion Criteria Module 270, these measurements are fed back to the Self-learning Optimization Module 250, which automatically generates an instruction about the next version (or versions) of the website. The instruction about the new version of the website is again processed by the Website Configuration Module 260, creating a new version of the website whose performance is measured and sent back to the Self-learning Optimization Module 250.

The iterative, self-learning optimization process continues until the user-defined completion criteria have been met. The end of the optimization process is determined by the Completion Criteria Module 270. An Optimum Solution Deployment Module 280 module implements the optimum solution, or solutions in case of a multi-segment experiment.

Figure 3:
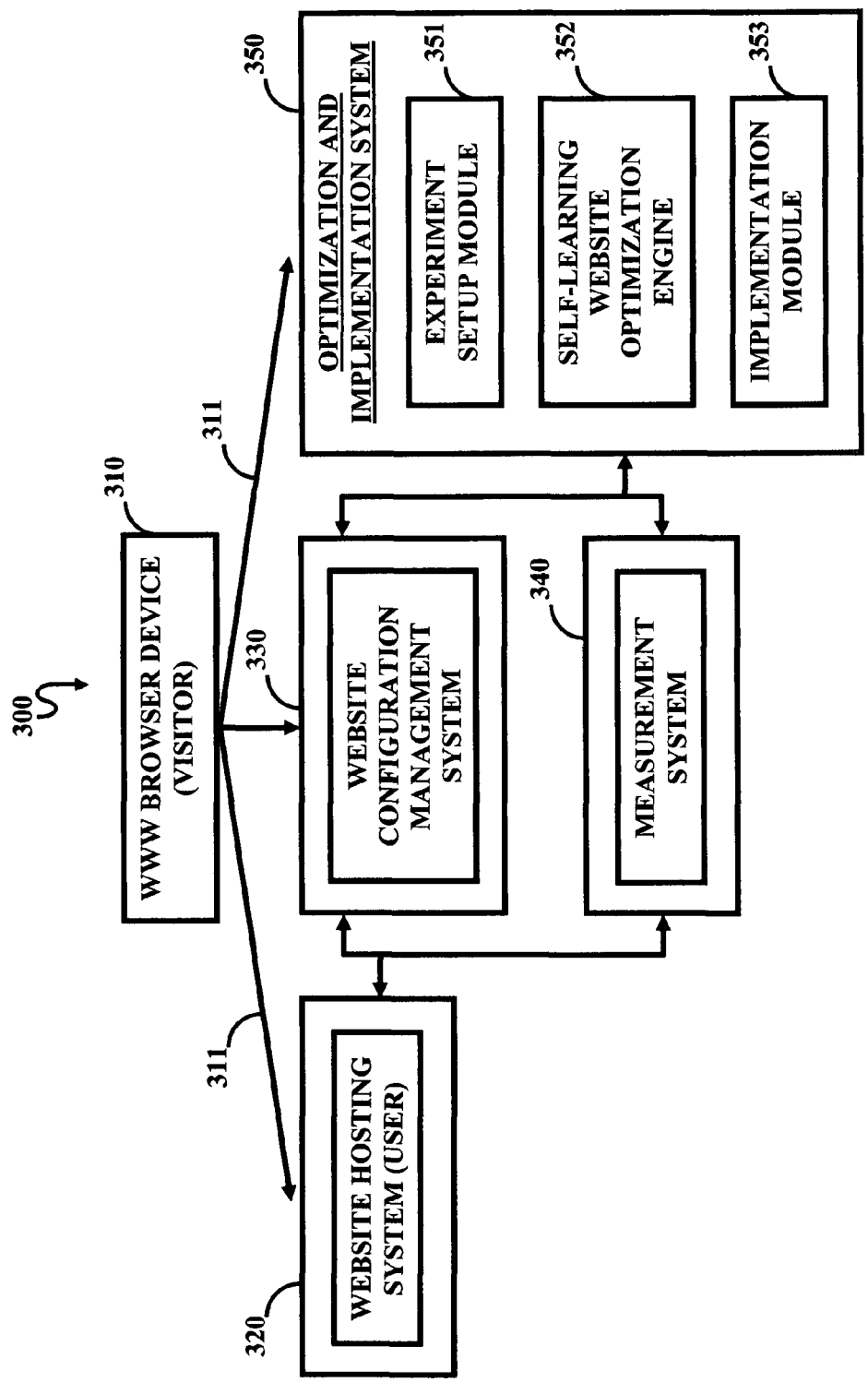
FIG. 3 is a schematic diagram of a system capable of closed loop website optimization according to the present invention.

One embodiment of a system capable of carrying out the present-inventive closed loop optimization approach is illustrated in FIG. 3. The optimization system 300 includes one or more World Wide Web Brower Devices 310 which website visitors use to access a website undergoing optimization. The website may be hosted, for example, by a Website Hosting System 320 via an Internet Connection 311. A Website Configuration Management System 330 manages the configuration of the website as presented to the browser 310. A Measurement System 340 measures one or more website performance variables, such as the number of clicks on particular hyperlink or website button in accordance with user-defined optimization goals.

An Optimization and Implementation System 350 is the primary website optimization system. The system 350 enables experiment setup via an Experimental Setup Module 351, self-learning optimization via a Self-Learning Optimization Module 352, and post optimization implementation via an Implementation Module 353. The modules 351 and 352 are described in more detail, infra, with reference to FIGS. 4 and 5. The optimization solution can be delivered as a packaged application to be installed on the user's own system, or it can be delivered as a shared, hosted solution provided by a specialized service provider. The terms "user" and "end-user" are used interchangeably throughout this Letters Patent, referencing the entity that owns or has dominion over the web site, or desires to optimize performance of a website.

The Website Configuration Management System 330 can be of the stand-alone variety, or it can be subsumed by the Website Hosting System 320, the Browsing Device 310, or the Optimization and Implementation System 350. Similarly, the Measurement System 340 can be of the stand-alone variety, or part of other systems included in the Optimization Apparatus 300.

Figure 4:
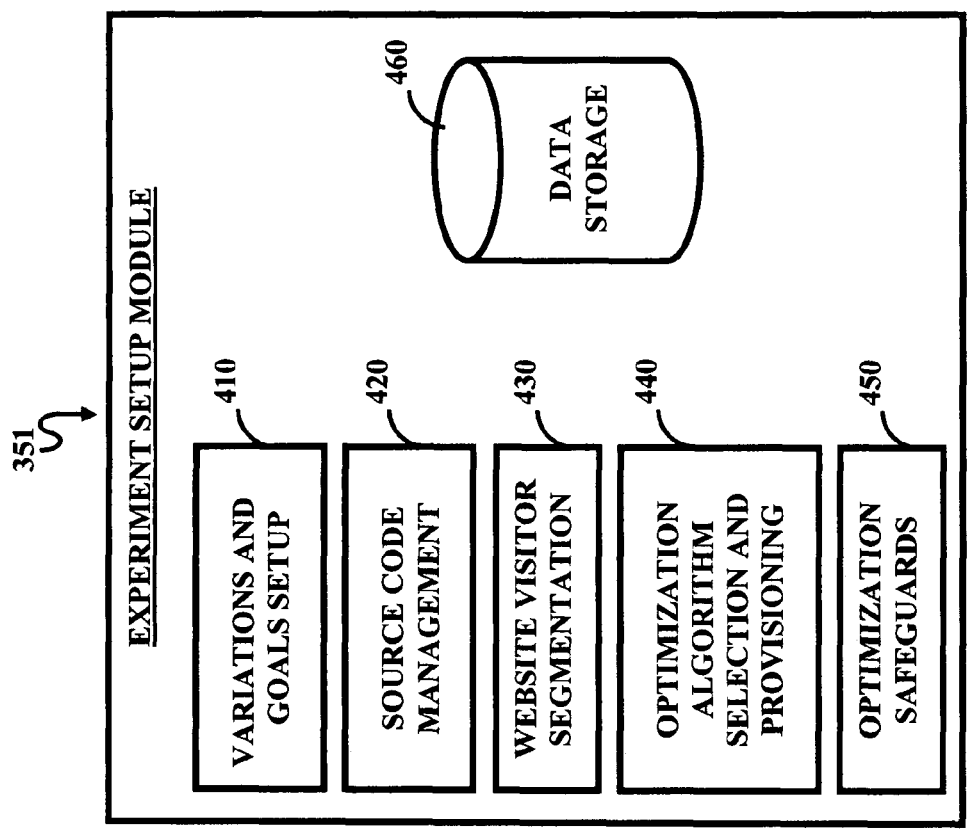
FIG. 4 is a schematic diagram detailing the Experiment Setup Module of the system in FIG. 3.

Turning to FIG. 4, the Experiment Setup Module 351 is described in more detail. The experiment setup operations enable integration between the existing website and the optimization system that will perform the optimization experiment. The integration can be accomplished in hard-wired way where website source code is changed to insert in the proper locations, program calls that will create the interaction with website and the optimization system. The program calls will typically be executed by the web servers, before sending the page to the browser, or by the browser itself, for example, using Java Script. Or, integration can be achieved via "soft" methods such as a reversed proxy approached described in U.S. Patent Application Number 20060271671, as well as others. Mostly, the integration can be manually performed via the interventions of trained technicians or programmers. However, considering that a typical user of the website optimization solution in a corporate setting is a non-technical marketing person, the preferred embodiment for the experiment setup module includes systems and software modules that will automate most of the aspects of the experiment setup.

A Variations and Goal Setup Module 410 activates a Graphical User Interface (GUI) driven visual setup tool that enables marketing professionals to visually select sections of website that will participate in the optimization process, and to assign variations of these sections. Also, the module enables visual selection of the conversion goals that the Measurement System will track and measure during the optimization process. The term "sections" is used in this description to define areas or elements of the web page that will be tested in the optimization experiment, and the term "variations" is used in this description to define different versions of the sections that will be tested during the optimization experiment.

An example of a suitable setup method is the subject of U.S. patent application Ser. No. 11/729,569 filed Mar. 29, 2007 by Buchs, et al., and assigned to Hiconversion, Inc., the assignee of the present Letters Patent, for "Method and Apparatus for Application Enabling of Websites," which is hereby incorporated by reference. Once web page sections and conversion goals are defined for the website optimization implementation, there is typically the need to perform source code editing that will add additional lines of code necessary for interaction with the website optimization system. A Source Code Management tool 420 enables automated website source code editing in the aforementioned patent application.

During the experiment setup a user may decide to segment the general website visitor population based on certain segmentation criteria such as, but not limited to, visitor source (such as certain search engines), geography, or daily time segments (so called day-parting). A Segmentation Component 430 enables capture and storage of the segmentation information. An Optimization Algorithm Selection and Provisioning Tool 440 enables selection and configuration of one of the optimization algorithms supported by the Self-Learning Website Optimization Module 352. A Safeguards Module 450 enables setup of the experiment safety trigger points as may be either default choices, or set by the user. If the optimization algorithm performance falls below a certain level, the user will either receive a warning or the experiment can be aborted.

Data generated by any of the components of the Experiment Setup Module 351 are stored in a Data Storage Module 460 comprising a data base management utility and permanent storage.

Figure 5:
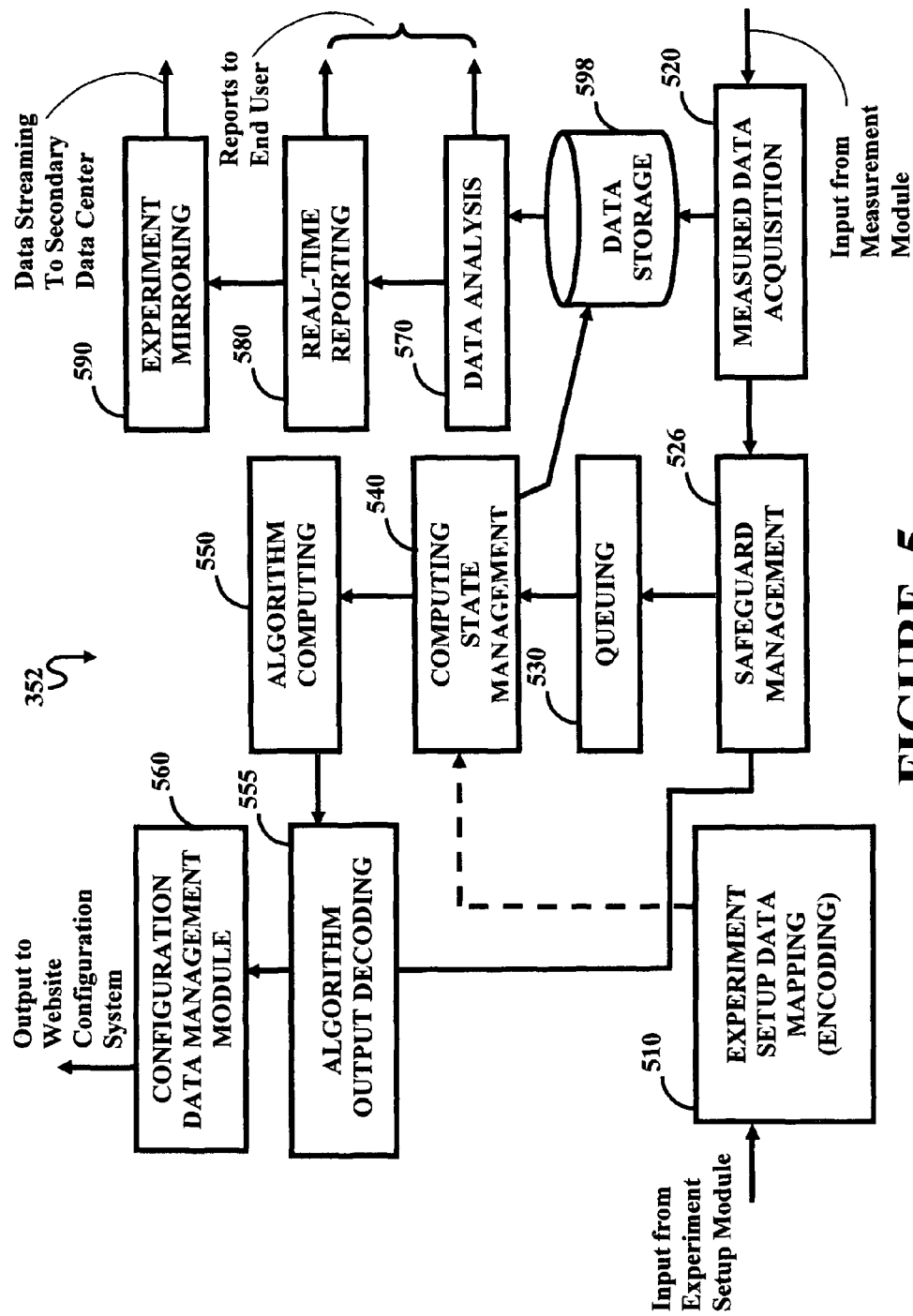
FIG. 5 is a schematic diagram detailing the Self-Learning Website Optimization Module of the system of FIG. 3.

Turning to FIG. 5, the Self-Learning Website Optimization Module 352 will now be described in more detail. An Experimental Data Modeling Module 510 processes data sets from the Experiment Setup Module 351. Abstract website optimization information is mapped to the specific data format of the self-learning algorithm employed. For example, if data is mapped to the algorithm based on the adaptive Wiener filter method, section variations might represent weights of the nth order filter, where n represents number of sections participating in the experiment. The encoding is specific to each algorithm. The experiment encoding information is then submitted to a State Management Module 540 which controls the algorithm computations.

A Measured Data Acquisition Module 520 acquires measurements and data sets produced by Measurement System 346. In addition to actual optimization goal results, Measurement System also delivers desired demographic and time stamp information. The collected data is then statistically analyzed in a Measured Data Estimation Module 522, which module supports one or more statistical data analysis methods, such as data regression, maximum likelihood estimation, and many others. A Safeguard Management Module 526 continually monitors the performance of the optimization algorithm and acts in accordance with the Experiment Setup trigger points established via the Safeguards Module 450. Based on the current conditions, the Safeguard Management Module 526 might suspend the algorithm and issue an experiment abort order through the Website Configuration Management System 330.

A Queuing Module 530 enables effective and simultaneous processing of multiple experiments. For example, the end user's objective to segment website visitors according to the search engine from which visitors originate will result in virtual experiments for each search engine. Consequently, there will be multiple optimization processes competing for the same resources. Queuing will ensure orderly effective execution of the iterative steps involved in the optimization process.

The State Management Module 540 enables effective use of the computing resources. Although the close loop iterative method of the present invention implies real-time computing, in practice, the experimentation requires processing of many visitors as a way to create statistically viable measurements. Depending on the volume of website traffic, the process might take minutes or hours to complete. During lulls, it is not efficient for the optimization module executing an optimization experiment to monopolize system resources. At such times, the State Management Module 540 temporarily saves all algorithm state attributes to a Data Storage Device 598, and frees computing resources for other experiments or users of the system. Once there is a need to process the next iterative step in the optimizationalgorithm, the state attributes are restored and next iterative step is then executed.

An Algorithm Computing Module 550 performs iterative computing in accordance with the logic of the particular optimization algorithm. The algorithm computing results are then fed into an Algorithm Output Decoding Module 555 which maps the algorithm output data into data understandable by a Configuration Data Management Module 560, which then submits this data to the Website Configuration Module 260.

A Data Analysis Module 570 and a Real-time Reporting Module 580 provide additional insight into experiment results. The Data Analysis Module 570 can pre-process and prepare standard reports so that such reports are immediately on demand for a user's viewing. To ensure maximum operational readiness a Data Mirroring Module 590 mirrors all experiment data sets on an alternative computing setup, so that in the event of system failure, the optimization experiment can be executed from the alternative location without noticeable impact on the performance of the experiment.

Figure 6:
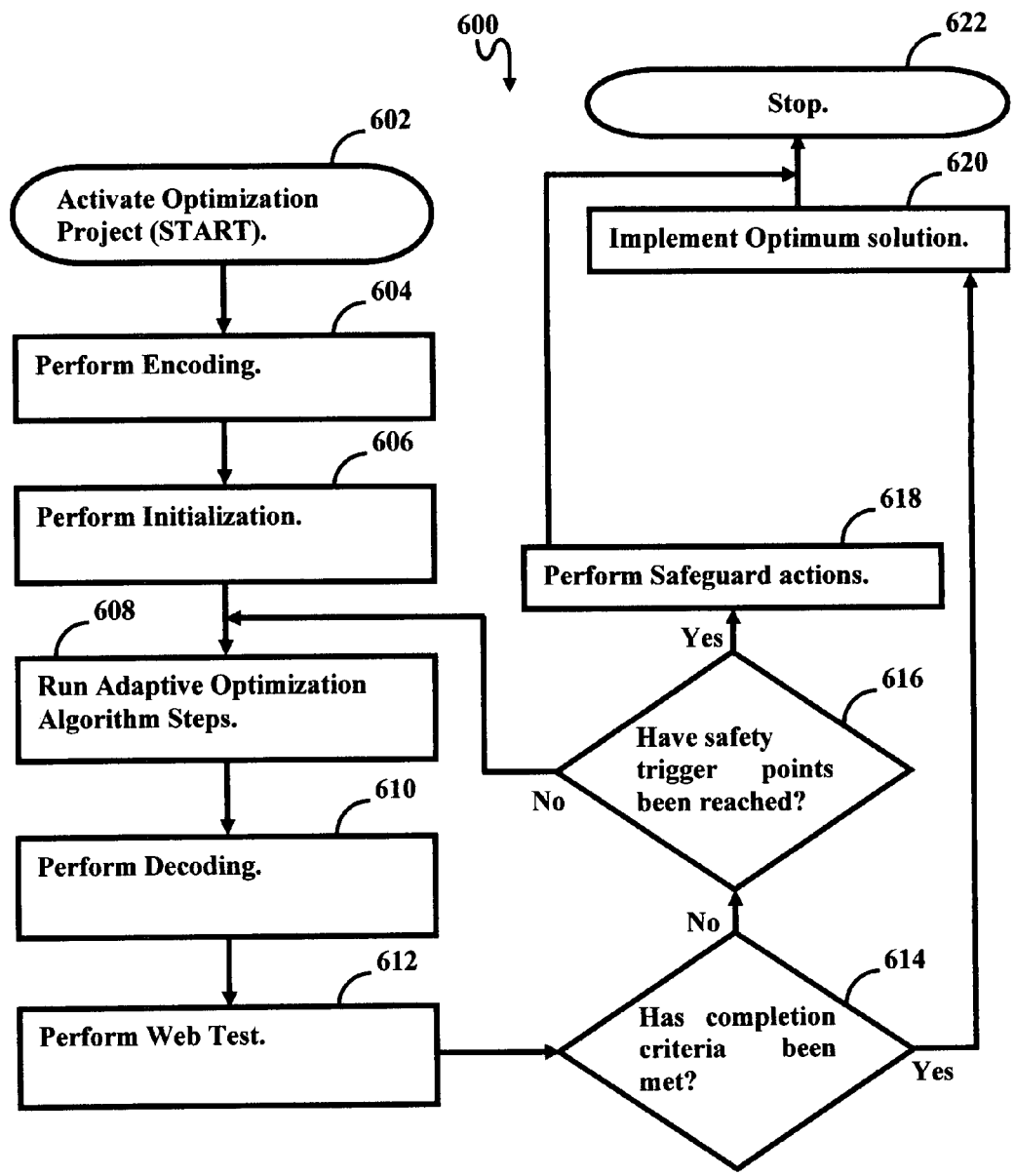
FIG. 6 is a flowchart illustrating the steps carried out by an adaptive optimization algorithm according to the present invention.

FIG. 6 further describes closed-loop optimization steps performed by the optimization program. The actual website optimization program 600 is carried out by the optimization module 250. The program execution begins with Step 602, in which a Project State File is created or updated by storing project set-up data therein. In addition to supplying data for use during the optimization project, the Project State File also stores new data generated during the optimization project. In Step 604, the optimization setup data is encoded into a data format required by the specific optimization algorithm. Step 606 initializes the iterative algorithm execution. Steps 606-620 are the primary elements of the closed loop iterative optimization procedure.

In Step 608, the Adaptive Optimization Algorithm performs an iterative computing step based on the measurements collected during the web tests performed in Step 612. In Step 610 the output of algorithm is decoded in the data format understandable to website configuration module 560. The new website configuration is tested in Step 612, and new measurement data is then collected. Before repeating the iterative loop, the program performs an experiment completion test in Step 618 and a safety trigger test in Step 620. If measured results have satisfied the completion criteria, the program terminates the optimization process and proceeds to implement the optimum solution in the Step 626. This step may be automatically performed immediately following the successful completion of the optimization experiment, or at some later date.

If a safety trigger point is reached, the program performs a Safeguard action defined in the experiment setup Step 602. An example of a safeguard action is the termination of the optimization experiment if the average web page conversion is below a certain threshold, and reinstating the base version of the page.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of automated, closed-loop, real-time website optimization comprising:
   a) receiving user-defined website optimization data including an optimization goal, and variable web content;
   b) receiving website source code;
   c) executing an optimization algorithm used to generate an optimized website version;
   d) comparing the website output with said website optimization goal;
   e) measuring website performance, which performance is based on web visitors' activity on the website in accordance with user-defined optimization goals;
   f) providing feedback from measured website performance to an input of said optimization algorithm;
   g) based upon said feedback, determining the next iterative step of said optimization algorithm;
   h) performing new iterative steps of said optimization algorithm;
   g) converging to an optimized website state; and
   j) modifying the website source code to implement the optimum version of the website.

2. The method of claim 1, wherein said website optimization data comprise web page sections that will participate in an optimization experiment.

3. The method of claim 1, wherein said website optimization data comprise web page section variations.

4. The method of claim 1, further comprising:
via website source code enabling, facilitating interaction between an active website and the website optimization solution.

5. The method of claim 1, further comprising:
coding user-defined experiment setup information into a data format required by the specific optimization methodology and algorithm.

6. The method of claim 1, further comprising:
decoding data produced by the optimization algorithm into a data format usable by other components participating in a website optimization experiment.

7. The method of claim 1, further comprising:
statistically analyzing and estimating measured data.

8. The method of claim 1, further comprising:
implementing user-defined safety thresholds, and actions associated with said thresholds.

9. The method of claim 1, further comprising:
concurrently executing a plurality of optimization experiments.

10. The method of claim 1, further comprising:
classifying website visitors in accordance with predefined segmentation criteria; and
applying the website optimization algorithm only on selected segments of visitors.

11. The method of claim 1, further comprising:
classifying website visitors in accordance with predefined segmentation criteria; and
conducting a separate optimization experiment for a particular market segment.

12. The method of claim 1, further comprising:
preserving the algorithm state and data created or used during the execution of iterative optimization steps; and
temporarily suspending the execution of an optimization experiment during the comparing of the output of the optimization algorithm with said website optimization goal.

13. The method of claim 1, further comprising:
automatically modifying a website configuration and appearance in response to the output of the optimization algorithm.

14. The method of claim 1, further comprising:
publishing the modified website source code to a website hosting entity.

15. An optimization system for the automated, closed-loop, real-time optimization of a website comprising:
a) at least an Internet device adapted to allow access to a website by an Internet user;
b) a web server adapted to host said website;
c) a website configuration management module adapted to automatically change the website content and appearance;
d) a website performance measurement module adapted to automatically measure multiple performance variables, which performance variables are based on web visitors' activity on the website in accordance with user-defined optimization goals; and
e) an optimization engine adapted to execute one or more optimization algorithms;
wherein said optimization engine is further adapted to receive feedback from said website performance measurement module to an input of said optimization algorithm, and based upon said feedback, determine the next iterative step of said optimization algorithm, perform new iterative steps of said optimization algorithm, and converge the website to an optimized state.

16. The optimization system of claim 15, further comprising:
a communication link adapted to enable real time communication and data exchange between elements of the system.

17. The optimization system of claim 15, further comprising:
an experiment setup module adapted to enable website optimization experiment setup data entry and preparation.

18. The optimization system of claim 15, further comprising:
an optimum solution implementation module adapted to enable the implementation of the optimum website version.

19. The optimization system of claim 15, further comprising:
an experiment setup data coding module adapted to receive website optimization experiment setup data and optimization criteria, such as the optimization goals, definitions of section, section variations, or the experiment completion criteria;
a measured data acquisition module adopted to acquire and further process website performance measurements;
an optimization algorithm executer adapted to execute an optimization algorithm;
an optimization tester adapted to measure the performance of said website against website optimization completion criteria to determine whether the website state is optimized;
an optimization engine safeguard adapted to compare website performance against pre-defined safeguard limits and to act in accordance with implemented policy; and
an optimization algorithm decoder adapted to map the output from the optimization algorithm executer into a data format acceptable to said website configuration management module.

20. The optimization system of claim 15, further comprising:
a data storage module adapted to store website optimization data.

* * * * *